(12) United States Patent
Tanaka et al.

(10) Patent No.: US 11,397,038 B1
(45) Date of Patent: Jul. 26, 2022

(54) COAXIALLY PUMPED COOLING STATION

(71) Applicant: Seagate Technology LLC, Cupertino, CA (US)

(72) Inventors: Samuel Lewis Tanaka, San Leandro, CA (US); Thomas Larson Greenberg, Berkeley, CA (US)

(73) Assignee: Seagate Technology LLC, Fremont, CA (US)

( * ) Notice: Subject to any disclaimer, the term of this patent is extended or adjusted under 35 U.S.C. 154(b) by 435 days.

(21) Appl. No.: 15/652,814

(22) Filed: Jul. 18, 2017

(51) Int. Cl.
*F25D 17/00* (2006.01)
*F25D 3/00* (2006.01)
*F25D 29/00* (2006.01)

(52) U.S. Cl.
CPC ............... *F25D 17/00* (2013.01); *F25D 3/00* (2013.01); *F25D 29/001* (2013.01)

(58) Field of Classification Search
CPC ......... H01L 21/67109; H01L 21/67069; H01L 21/67748; H01L 21/67751; H01L 21/67017; F25D 29/001; F25D 3/00; F25D 31/001; G11B 33/1426; F26B 3/283
See application file for complete search history.

(56) References Cited

U.S. PATENT DOCUMENTS

| | | | |
|---|---|---|---|
| 5,287,914 A * | 2/1994 | Hughes | B01J 3/006 118/724 |
| 5,753,092 A | 5/1998 | Hollars et al. | |
| 6,497,799 B1 * | 12/2002 | McLeod | C23C 14/165 204/192.12 |
| 8,524,052 B1 * | 9/2013 | Tan | C23C 16/02 204/298.09 |
| 8,563,095 B2 * | 10/2013 | Rajagopalan | C23C 16/45523 427/579 |
| 2003/0167612 A1 * | 9/2003 | Kraus | H01L 21/67017 29/25.02 |
| 2010/0190036 A1 | 7/2010 | Komvopoulos et al. | |
| 2011/0127156 A1 * | 6/2011 | Foad | G11B 5/8404 204/192.12 |
| 2012/0231158 A1 * | 9/2012 | Ueno | C23C 14/50 427/128 |
| 2016/0047596 A1 * | 2/2016 | Yi | G11B 5/8404 62/62 |
| 2016/0305013 A1 * | 10/2016 | Hilkene | C23C 14/042 |
| 2017/0178920 A1 * | 6/2017 | Dole | H01L 21/31116 |

* cited by examiner

*Primary Examiner* — Frantz F Jules
*Assistant Examiner* — Webeshet Mengesha
(74) *Attorney, Agent, or Firm* — Mueting Raasch Group (57) ABSTRACT

An apparatus comprises a chamber and two pumps coupled to opposing sides of the chamber. The chamber is configured to receive a medium and includes a first cryogenically cooled structure having a first surface and an opposing second surface and a second cryogenically cooled structure having a first surface and an opposing second surface. The first surface of the first cryogenically cooled structure faces the first surface of the second cryogenically cooled structure forming a gap. The gap is configured to receive the medium. The chamber also includes a gas inlet.

18 Claims, 6 Drawing Sheets

COAXIALLY PUMPED COOLING STATION

SUMMARY

Embodiments of the disclosure are directed to an apparatus comprises a chamber and two pumps coupled to opposing sides of the chamber. The chamber is configured to receive a medium and includes a first cryogenically cooled structure having a first surface and an opposing second surface and a second cryogenically cooled structure having a first surface and an opposing second surface. The first surface of the first cryogenically cooled structure faces the first surface of the second cryogenically cooled structure forming a gap. The gap is configured to receive the medium. The chamber also includes a gas inlet.

Further embodiments are directed to an apparatus comprising a chamber and two turbomolecular pumps coupled to opposing sides of the chamber such that the pumps are coaxial with each other. The chamber is configured to receive a medium and includes a first cooled structure having a first surface and an opposing second surface and a second cooled structure having a first surface and an opposing second surface. The first surface of the first cooled structure faces the first surface of the second cooled structure forming a gap, and the gap is configured to receive the medium. The chamber also includes a gas inlet.

Additional embodiments are directed to an apparatus comprising a chamber configured to receive a medium. The chamber includes a gas inlet, a first cooled structure having a first surface and an opposing second surface, and a second cooled structure having a first surface and an opposing second surface. The first surface of the first cooled structure faces the first surface of the second cooled structure forming a gap, and the gap is configured to receive the medium. The apparatus further includes a first throttle valve coupled between a first side of the chamber and a first pump and a second throttle valve coupled between a second side of the chamber and a second pump. The second side is opposite the first side, and the first and second throttle valves are configured to reduce a volume of the chamber when in a closed position.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification, the appended drawings are referenced wherein.

The figures are not necessarily to scale. Like numbers used in the figures refer to like components. However, the use of a number to refer to a component in a given figure is not intended to limit the component in another figure labeled with the same number.

DETAILED DESCRIPTION

Reliance on technology and big data continues to increase the need for data storage devices. A popular form of storage is the data storage disk, or recording medium. Data may be recorded on disks by various electronic, magnetic, optical, or mechanical changes to one or more layers of the recording medium. One form of electromagnetic recording, heat assisted magnetic recording (HAMR), is a technology that enables storage density in hard disk drives well beyond 1 $Tb/in^2$. The recording process starts by heating a small region of the disk above Curie temperature ($T_c$) using a near field transducer. The region is subsequently cooled rapidly in the presence of a magnetic field from the recording head. The magnetic field maintains the orientation of magnetization in the local region of heated media as it cools, thereby encoding a bit with data for storage. By reducing the local media anisotropy (K) at high temperature (e.g., above TA HAMR makes it possible to record data on high anisotropy material such as L10-FePt. The high anisotropy in L10-FePt extends the superparamagnetic limit faced with conventional magnetic recording, so that grain size can be further reduced to increase signal-to-noise ratio. However, the high anisotropy FePtX (X being an optional dopant) of HAMR media requires high temperature processing (e.g., above $T_c$) that presents a challenge to production of media with similar, or lower, roughness as compared to current, conventional perpendicular media.

Production of HAMR media involves multiple thin-film processing steps (e.g., as many as 24 or more). Many of these thin-film deposition steps involve increased temperatures. A significant limitation in the unit per hour production rate for recording disks is the time it takes to cool each disk between certain processing steps, such as before a carbon overcoat layer is applied. Previous cooling techniques have been unreliable and have had limitations on the achievable cooling rates due to the time involved in actuating cooling plates for the techniques. In embodiments described herein, a cooling station utilizes higher gas pressure, faster pumping, and an increased temperature difference (A) between the cooling plates and the disk, as compared with previous cooling techniques, to increase the cooling efficiency of a cooling station. For example, the length of time each disk is exposed to cooling forces is increased while maintaining the same, or decreasing the amount of, time within the cooling station. When the amount of time each disk is processed in the cooling station is decreased, the recording disk production rate is increased.

Figure 1A:
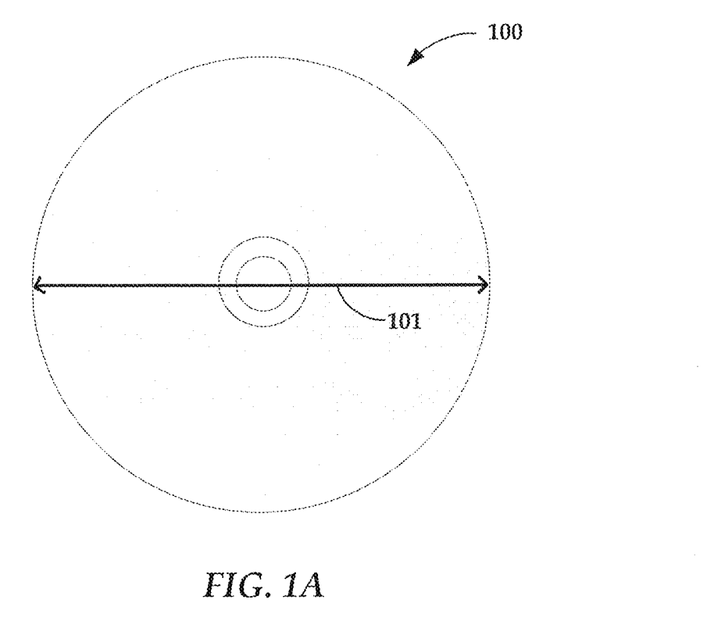
FIG. 1A is a top-down view of a recording medium according to embodiments discussed herein.

Turning to FIG. 1A, an example recording medium 100, or disk, is shown. Cooling stations described herein are configured to receive a recording medium 100, or disk, and those disks may be a variety of sizes. For example, recording media can have varying diameters 101, such as, 95 mm, 84 mm, 70 mm, 65 mm, 27 mm, and 21 mm, to fit varying device form factors. While the recording medium 100 is illustrated as a circular disk, the medium could take a variety of shapes.

Figure 1B:
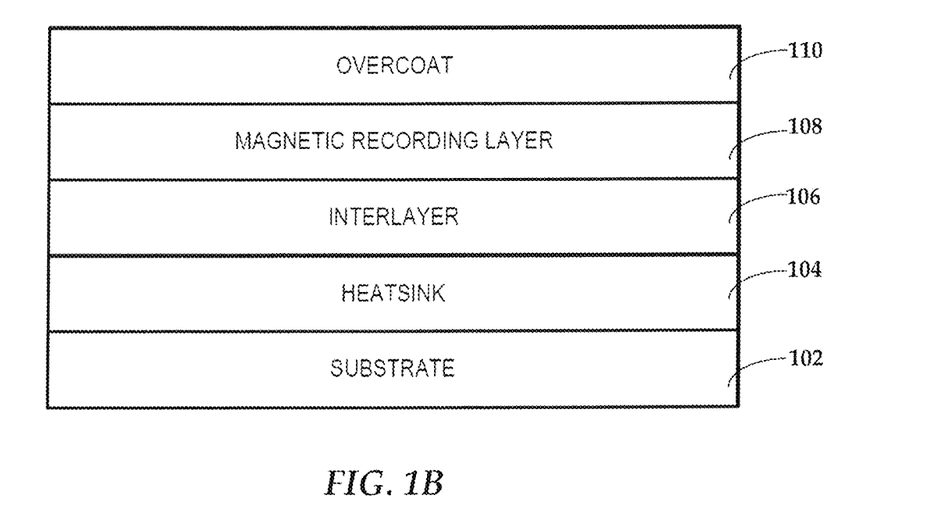
FIG. 1B is a cross-sectional view of a recording medium according to embodiments discussed herein.

In FIG. 1B, a cross-sectional view illustrates example thin-film layers that comprise the recording medium 100. A recording medium 100, such as a HAMR medium, can include a substrate 102, at least one heatsink layer 104, an interlayer 106, a magnetic recording layer 108, and an overcoat 110 (e.g., carbon overcoat and/or lubricating layer). One or more of these example layers, such as the interlayer 106 and magnetic recording layer 108, can comprise several thin-film layers and/or spacer layers. Thus, it can be seen that fabrication of a single recording medium 100 can involve a number of processing steps (e.g., 4-24+ steps). Reducing the amount of time it takes to cool a disk between steps, such as prior to applying the overcoat 110, can significantly increase the production throughput/output rate. Improving the cooling efficiency can also increase the quality of the carbon overcoat by allowing for the carbon overcoat to be deposited at lower process temperatures than are currently used. One way to implement such a reduction in cooling time is through a redesign of cooling station equipment.

Two significant influences on the cooling rate are pressure and temperature. In embodiments herein, the cooling chamber volume is reduced (e.g., by a factor of 3-4) as compared with previous cooling stations. The decreased chamber volume results in higher gas pressure for application of the same total amount of gas volume. The higher pressure represents more gas collisions with the disk and cooling structures, which leads to increased heat transfer. In addition, the cooling gas is typically a light gas (e.g., helium or hydrogen), which can be difficult to remove from the chamber (i.e., pump out). In certain embodiments, the cooling gas may, include a blended gas such as a combination of helium or hydrogen with another, heavier inert gas. In embodiments herein, increased pumping speed, regardless of the selected cooling gas, is implemented via more and/or faster pumps. The increased pumping speed reduces the portion of the total time in the cooling station operation dedicated to removing the cooling gas; therefore, the chamber can stay at a higher pressure for a longer portion of the total cooling station processing time (i.e., more cooling time without lengthening the total processing time in the cooling station). Further, the temperatures of the cooling structures in the chamber are decreased, thereby increasing the temperature difference ($\Delta T$) between the disk and cooling structures. As explained by Stefan-Boltzmann's law for heat transfer via radiation between two black bodies, $\dot{Q}=\sigma AF(T_2^4-T_1^4)$, a larger difference in temperatures increases the rate of heat transfer. For example, a disk temperature of 500° C. and a cooling structure temperature of −140° C. (e.g., cryogenic cooling) yields a multiplier of (500−(−140)=640°), whereas a disk temperature of 500° C. and a cooling structure temperature of 20° C. (e.g., cold water cooling) yields a multiplier of (500−(20)=480°). Inserting these respective temperature multipliers back into the heat transfer equation would clearly influence the heat transfer rate. Embodiments discussed herein are directed to altering the pressure and temperatures present in a cooling station to increase cooling efficiency.

Figure 2A:
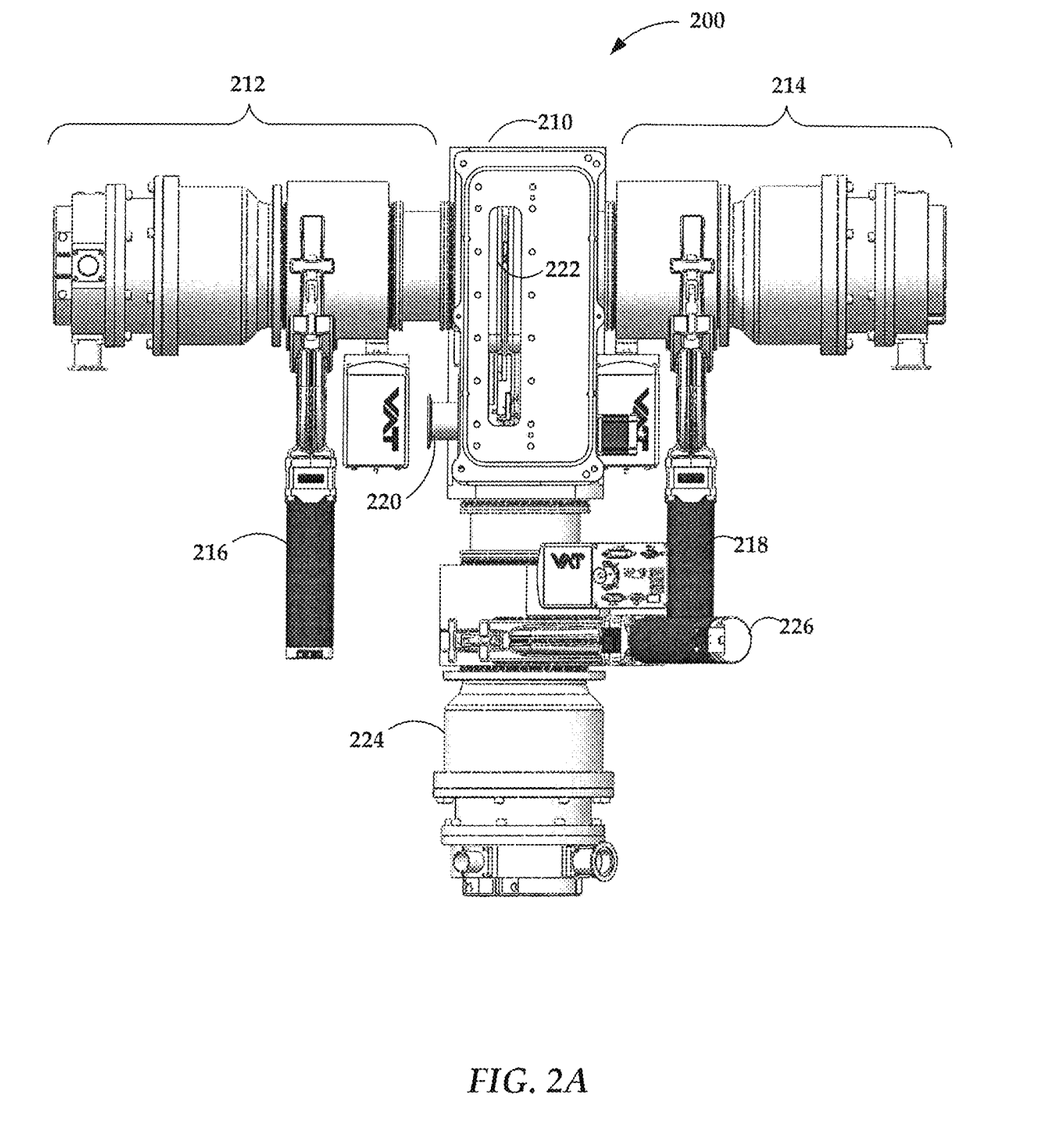
FIG. 2A is a front view of a cooling station according to embodiments discussed herein.

FIG. 2A is a front view of a cooling station 200 as discussed in several embodiments herein. The cooling station includes a chamber 210, two coaxial pumps 212, 214, and a third pump 224. The chamber 210 is located between the pumps 212, 214 and includes an opening 222, e.g., a slot, for receiving a recording medium that is at some stage in the fabrication process. While the recording medium is typically a circular disk, the medium can take a variety of shapes and the opening 222 is configured accordingly. The opening 222 as illustrated has a vertical orientation, which can facilitate disk transport through a fabrication process/machinery and provides a compact chamber design; however, the opening 222 can be oriented at a variety of angles, including horizontal or perpendicular to the orientation shown. The opening 222 can also be adjustable to accept varying sizes of recording media (e.g., disks of varying diameters). Internal features of the chamber 210 are discussed further in connection with FIGS. 3-4.

Connected to opposing sides of the chamber 210, are two coaxial pumps 212, 214. Both pumps can be the same, but oriented in opposite directions from the chamber 210. Alternatively, different pumps may be used on each side. The pumps 212, 214 are located behind, and are coaxial with, the cooling structures 232 in the chamber. Thus, when a medium is positioned in the chamber between the cooling structures 232, the medium, cooling structures 232, and pumps 212, 214 would be coaxial. In certain embodiments, the pumps 212, 214 are turbomolecular pumps that are high speed, light gas pumps such as the turbo vacuum TV 551 pump manufactured by Varian. For example, the turbomolecular pumps may include a high frequency motor driving a turbine fitted with multiple bladed states and macrotorr stages. The turbine may reach 42,000 rpm. Each pump may have a three-phase electric motor and a dedicated controller that can be operated by a remote host via a serial connection. The pumps 212, 214 can also include a thermal sensor, e.g., a thermistor, to prevent overheating in connection with a cooling system. In addition, the third pump 224 (or, in certain embodiment, more pumps) is also a turbomolecular pump as described above. Each pump couples to the chamber 210 via a high vacuum flange, and includes a gate valve that when closed, isolates the respective pump. The gate valves are activated by a respective handle 216, 218, 226. Each of the pumps 212, 214, and 224 are backed by any number of roughing pumps, as is known in the art.

The chamber 210 is also coupled, through one or more lines at opening 220, to equipment for cooling the cooling structures 232 positioned within the chamber 210. In certain embodiments, the cooling equipment performs cryogenic cooling and includes a compressor, reservoir, controller, etc. Further lines and/or equipment (not shown) couple to a gas inlet of the chamber 210 to introduce cooling gas. The gas introduction equipment is positioned based on proximity to the medium's position during processing.

Figure 2B:
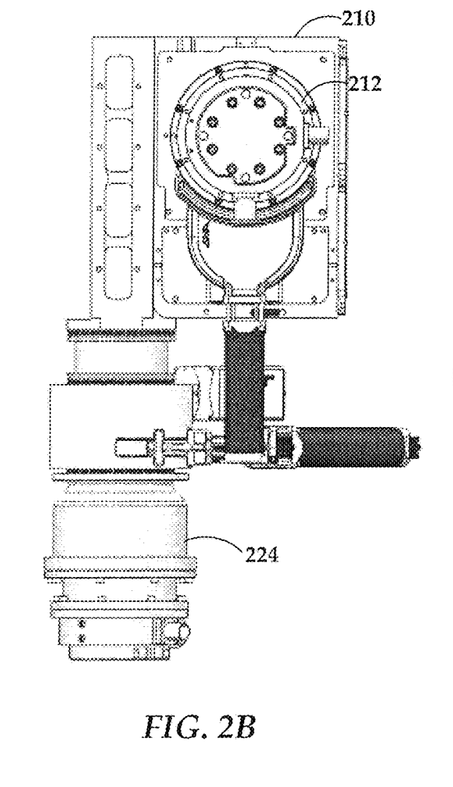
FIG. 2B is a side view of a cooling station according to embodiments discussed herein.
Figure 2C:
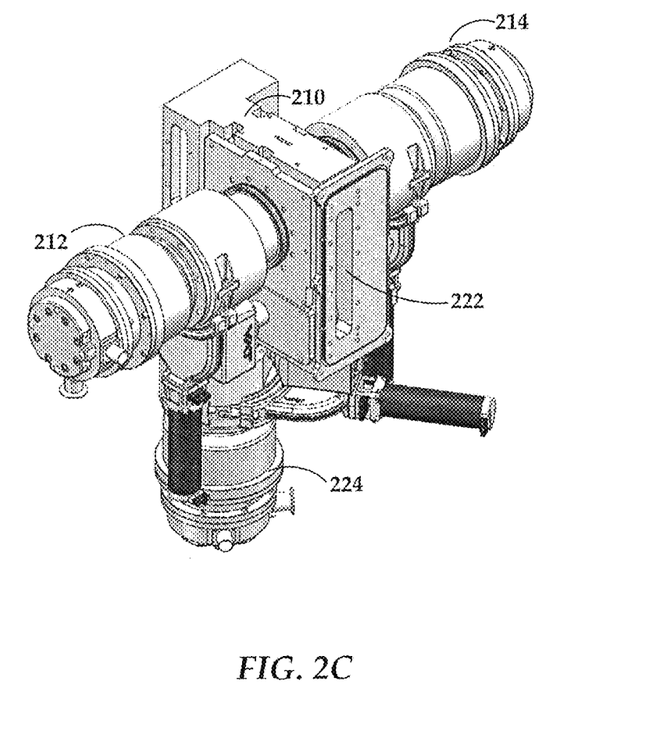
FIG. 2C is a perspective view of a cooling station according to embodiments discussed herein.

FIG. 2B is a side view of the cooling station illustrating pump 212. FIG. 2C is a perspective view of the cooling station. The overall design of the cooling station can be compact for implementation with other thin film processing stations in a disk fabrication process. As may be seen, a disk enters the cooling station 200 through slot 222 and then may exit the cooling station 200 through a corresponding slot on the opposite side of the chamber 210. Alternatively, the disk can index out of the same slot 222. The cooling station 200 can also include one or more additional pumps. For example, a larger backing pump such as a blower pump can be positioned behind the pumps 212, 214 to further increase pumping capability and rate. In certain embodiments, one or more blower pumps could be positioned on a third side of the chamber 210 and used in connection with the turbo pumps 212, 214. Alternatively, one or more blower pumps can replace the turbo pumps 212, 214.

Figure 3:
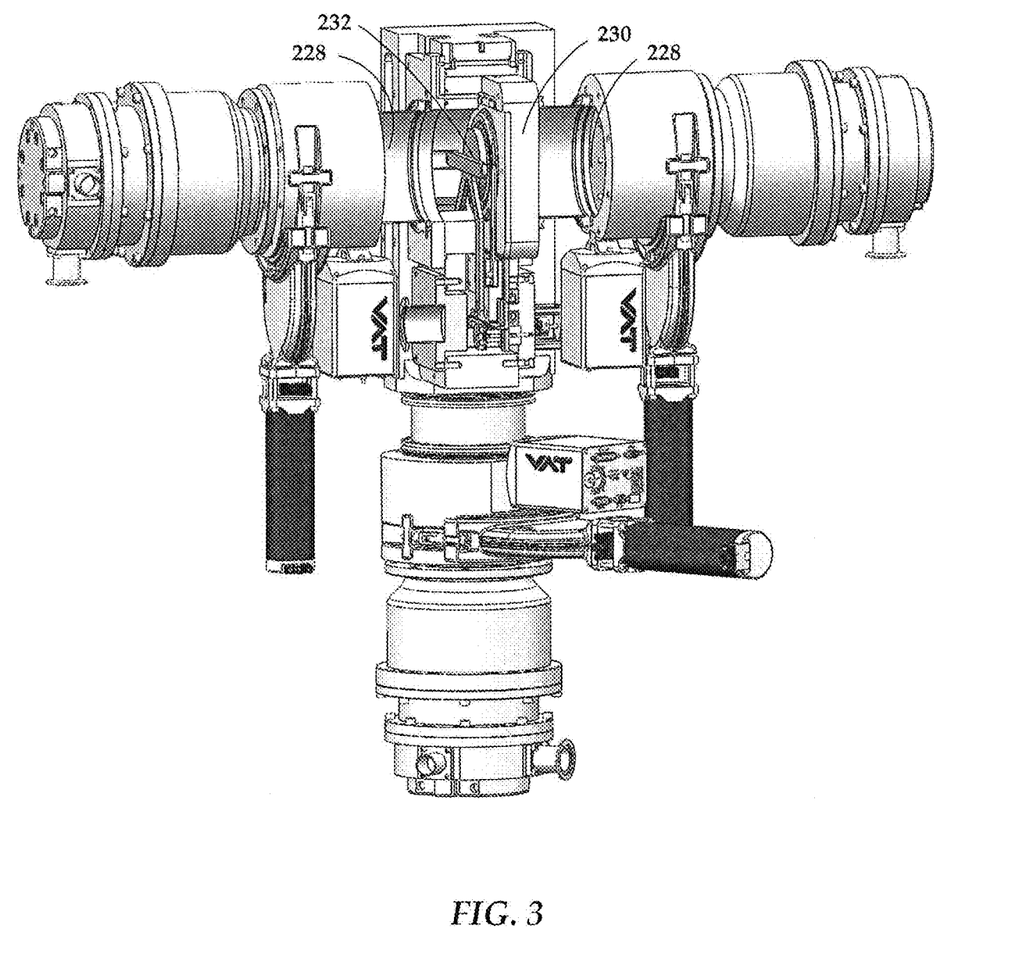
FIG. 3 is a partial cross-sectional cutaway view of a cooling station according to embodiments discussed herein.

In FIG. 3, the chamber housing is removed to illustrate internal features of the chamber 210. The chamber volume can be controlled by activating one or both throttle valves 228 located between each of the respective pumps 212, 214 and the chamber 210. Closing the throttle valves reduces the chamber volume, thereby facilitating faster cooling of the medium. When a medium is being processed, it is positioned between two cooling structures, one of which 232 is shown in FIG. 3. The other cooling structure is located substantially parallel to the first forming a gap between the two cooling structures. The gap is configured to receive the medium. The cooling structures comprise an enlarged portion (e.g., a plate or disk) coupled with a plurality of legs which couple to the cryogenic cooling source. Due to the cryogenic temperatures, the cooling structures 232 are thermally isolated from the system and other components in the chamber 210. The cooling structures 232 comprise two branches of a cooling system that share a cold finger (e.g., a ceramic floated cold finger) and a bridge between the two branches located below the chamber 210. In certain embodiments, the cooling structures are cryogenically cooled plates that may correspond in size to the diameter of the medium being cooled. For example, the cryogenically cooled plates may have a diameter of about 50-200 mm. For example, when the cooling station is designed to accommodate a variety of media sizes, the cryogenically cooled plates may correspond to the largest size medium. The cooling plates remain static and are positioned as close as possible to the medium. For example, each side of a medium may be within 0.1 mm to 1 cm of one of the cooling plates. The plates can be integrated into existing cooling station cryogenic/cooling equipment or they can be coupled with stand-alone equipment such as a cryogenic compressor. The chamber can also include an insert 230 for localized gas injection. The insert 230 further reduces the chamber volume. The insert 230 injects gas, e.g., helium, hydrogen, or a blended gas, into the chamber 210 between the cooling plates. Alternatively, the insert 230 can be configured to inject gas behind the plates (e.g., between the plates and the throttle valves 228) or radially into the chamber 210.

Figure 4:
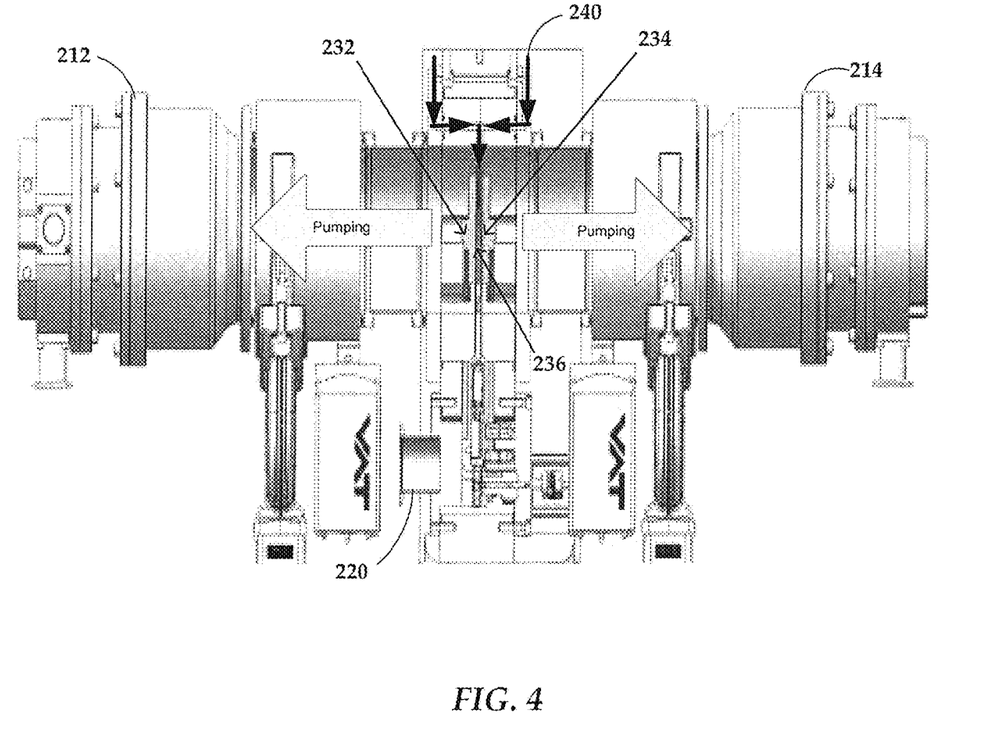
FIG. 4 is a partial cross-sectional cutaway view of a cooling station according to embodiments discussed herein.

In FIG. 4, the front of the insert 230 is removed to illustrate gas flow through the chamber 210 during cooling. Here, both cryogenically cooled plates 232, 234 are illustrated with arrows. Also, the location of the medium between plates 232, 234 is illustrated with arrow 236. Arrows 240 show an example gas injection path. The cooling gas, e.g., helium or a helium blend, is injected into the top of the chamber 210 at one or more locations; two are shown. The initial paths are then joined above the medium 236 as the paths converge into a single path directed down, between plates 232, 234. Alternatively, the two injection locations can remain as separate paths and each inject gas behind a respective cooling plate 232, 234—between the plates and the throttle valves/pumps. The injected gas increases the pressure in the chamber 210 and cools the medium via free molecular regime convection. In the chamber 210, convection is governed by molecular regime kinetic gas theory. The corresponding heat transfer is defined by Kennard's law, $\dot{Q}=A_1*\alpha(T)*\Omega*p*(T_2-T_1)$, where p represents pressure such that the higher the pressure, the more heat transfer occurs (i.e., higher pressure leads to increased cooling rate). Once the medium temperature drops a predetermined amount, or reaches a predetermined temperature, the throttle valves are opened. A pyrometer (not shown) is mounted to an inner wall of the chamber 210 to optically measure the disk temperature as the disk leaves the cooling station 200. Alternatively, a thermal sensor (e.g., another pyrometer) may be positioned to monitor the disk cooling in situ for real-time closed loop cooling control. The pumps 212, 214 remove the injected gas at a rate of about 500 L/s. In certain embodiments, the pumps 212, 214 operate during continuous gas flow injection rather than starting and stopping for a static gas pressure mode. Each of the small chamber volume, close positioning of the cooling structure plates to the medium, large difference in temperature between the plates and the received medium, and high pumping rate contribute to a longer time cooling within the predetermined time the disk is in the cooling station. When this increased cooling rate corresponds to a shortened amount of cooling processing time, the disk production rate is increased.

Figure 5:
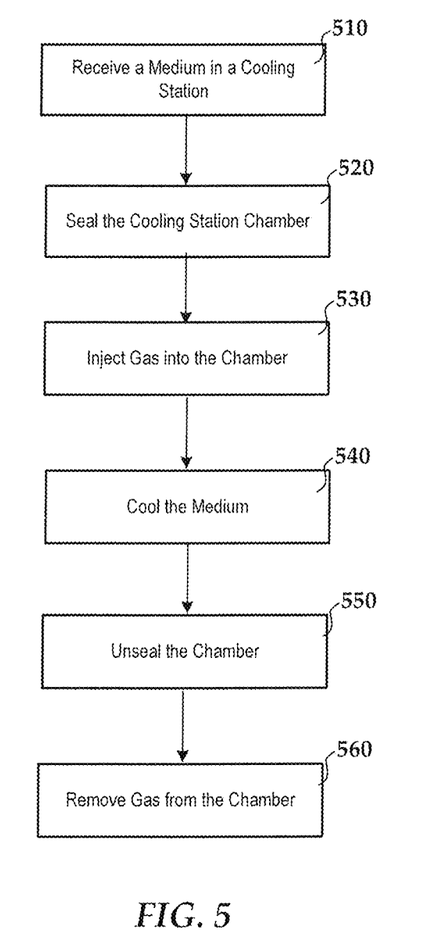
FIG. 5 is a flow diagram illustrating a cooling process, according to embodiments discussed herein.

FIG. 5 further illustrates a flow chart of a method of cooling a recording medium using a cooling station described herein. The method involves receiving a recording medium, e.g., a disk that is in the process of being fabricated, in a cooling station 510. As discussed above, the medium typically indexes into the cooling station in a vertical orientation after a processing step involving high temperatures (e.g., above $T_C$). Within the station, the medium is positioned between two cryogenically cooled plates that are held static and as close to the medium as possible at an initial pressure.

After insertion of the medium, the cooling station chamber is sealed 520 by closing the throttle valves between the coaxial pumps on each side of the medium and the chamber. As with the insertion and removal of the medium from the cooling station, the steps described herein can be automated and controlled by computer circuitry for efficiency. However, the steps may also be conducted by hand. Sealing the chamber reduces the chamber volume. Next, gas is introduced, e.g., injected, into the chamber 530. While various gasses can be used, helium, hydrogen, and other typical cryogenic gasses (e.g., gas blends) are preferred. The gas can be injected between the cooling plates, radially injected into the chamber, and/or locally injected behind the plates. Introduction of the gas raises the pressure in the chamber and allows for free molecular regime convection. The medium is then cooled 540. The temperature of the medium may be measured, or continually monitored, and when the medium temperature is reduced, e.g., by a predetermined amount, the chamber is unsealed 550. The medium temperature reduction can be determined by the medium reaching a predetermined/specified temperature, the medium temperature being below a threshold, or the medium temperature experiencing a predetermined change (e.g., a predetermined temperature delta). Alternatively, the temperature may not be measured directly. With various parameters being known (e.g., initial medium temperature, cooling plate temperature, pressure, etc.), the medium may be processed in the cooling station for a predetermined amount of time calculated to correspond to a desired final medium temperature. When cooling based on a predetermined amount of time, the medium temperature can be checked and/or verified by a pyrometer as the medium indexes out of the cooling station. Cooling the medium in the sealed chamber described herein can expose the disk to the cooling gas flow for as long as necessary to meet media performance/production demands.

The cooling station chamber is unsealed by opening the throttle valves on the pumps. The coaxial pumps then remove the gas from the chamber 560 to return the chamber pressure to about the initial baseline pressure. Once the chamber pressure returns to approximately the initial pressure, the medium is removed from (indexes out of) the cooling station. The medium is typically then transferred to a subsequent processing station (e.g., application of a carbon overcoat). Increasing the amount of time the disk is exposed to the cooling gas flow, increases the cooling rate and efficiency of the cooling station.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
a chamber configured to receive a medium configured for heat assisted magnetic recording, the chamber comprising:
a first, static, cryogenically cooled structure having a first surface and an opposing second surface,
a second, static, cryogenically cooled structure having a first surface and an opposing second surface wherein the first surface of the first cryogenically cooled structure faces the first surface of the second cryogenically cooled structure forming a gap and the gap is configured to receive the medium, and
a gas inlet;
a first pump coupled to a first side of the chamber; and
a second pump coupled to a second side of the chamber, where the second side is opposite the first side.

2. The apparatus of claim 1, wherein the first and second pumps are positioned coaxial with the chamber.

3. The apparatus of claim 1, wherein at least one of the cryogenically cooled structures comprises a circular plate.

4. The apparatus of claim 3, wherein the first and second pumps are positioned coaxial with the at least one circular plate.

5. The apparatus of claim 1, wherein the first and second pumps are turbomolecular pumps.

6. The apparatus of claim 1, further comprising a temperature sensor.

7. The apparatus of claim 1, wherein the gas inlet is configured to radially inject gas into the chamber.

8. The apparatus of claim 1, wherein the gas inlet is configured to inject gas into the gap between the cryogenically cooled structures.

9. The apparatus of claim 1, wherein the gas inlet is configured to inject gas into the gap between the cryogenically cooled structures from a top side of the chamber.

10. An apparatus, comprising:
a chamber configured to receive a medium configured for heat assisted magnetic recording, the chamber comprising:
a first, static, cooled structure having a first surface and an opposing second surface,
a second, static, cooled structure having a first surface and an opposing second surface wherein the first surface of the first cooled structure faces the first surface of the second cooled structure forming a gap and the gap is configured to receive the medium, and
a gas inlet;
a first turbomolecular pump coupled to a first side of the chamber; and
a second turbomolecular pump coupled to a second side of the chamber, where the second side is opposite the first side and the first and second pumps are coaxial with each other and with the first and second static, cooled structures.

11. The apparatus of claim 10, wherein the first and second cooled structures are cryogenically cooled.

12. The apparatus of claim 11, wherein at least one of the cryogenically cooled structures is a plate.

13. The apparatus of claim 10, wherein the gas inlet is configured to radially inject gas into the chamber.

14. The apparatus of claim 10, wherein the gas inlet is configured to inject gas into the gap between the cryogenically cooled structures from a top side of the chamber.

15. An apparatus, comprising:
a chamber configured to receive a medium configured for heat assisted magnetic recording, the chamber comprising:
a first, static, cooled structure having a first surface and an opposing second surface,
a second, static, cooled structure having a first surface and an opposing second surface wherein the first surface of the first cooled structure faces the first surface of the second cooled structure forming a gap and the gap is configured to receive the medium, and
a gas inlet;
a first throttle valve coupled between a first side of the chamber and a first pump; and
a second throttle valve coupled between a second side of the chamber and a second pump, where the second side is opposite the first side and the first and second throttle valves are configured to reduce a volume of the chamber when in a closed position.

16. The apparatus of claim 15, wherein the first and second cooled structures are cryogenically cooled.

17. The apparatus of claim 15, wherein the first and second pumps are positioned coaxial with the chamber and the first and second throttle valves.

18. The apparatus of claim 1, wherein the gap is configured to receive the medium with a distance of 0.1-5 mm between respective medium major surfaces and the first surfaces of the first and second cooled structures.

* * * * *